(12) United States Patent
Henson et al.

(10) Patent No.: US 12,661,613 B2
(45) Date of Patent: Jun. 23, 2026

(54) CONTAMINENT REMOVAL SYSTEM USING SEPARATE LIQUID SORBENT LOOPS

(71) Applicant: Honeywell International Inc., Charlotte, NC (US)

(72) Inventors: Phoebe Henson, Glendale, AZ (US); Rebecca Kamire, Buffalo Grove, IL (US); Sean Skomurski, Highland Park, IL (US)

(73) Assignee: Honeywell International Inc., Charlotte, NC (US)

( * ) Notice: Subject to any disclaimer, the term of this patent is extended or adjusted under 35 U.S.C. 154(b) by 362 days.

(21) Appl. No.: 18/307,648

(22) Filed: Apr. 26, 2023

(65) Prior Publication Data

US 2024/0359132 A1 Oct. 31, 2024

(51) Int. Cl.
| | |
|---|---|
| *B01D 53/18* | (2006.01) |
| *B01D 53/14* | (2006.01) |
| *B60H 3/00* | (2006.01) |
| *B60H 3/02* | (2006.01) |
| *F24F 6/00* | (2006.01) |

(52) U.S. Cl.
CPC ......... *B01D 53/18* (2013.01); *B01D 53/1475* (2013.01); *B60H 3/0085* (2013.01); *B60H 3/02* (2013.01); *F24F 6/00* (2013.01); *B01D 2252/30* (2013.01); *B01D 2257/504* (2013.01); *B01D 2257/80* (2013.01); *B01D 2325/38* (2013.01)

(58) Field of Classification Search
CPC ............ B01D 53/1475; B01D 53/1425; B01D 2257/504; B01D 2257/80; B01D 63/02
USPC ....... 96/234, 243–371; 422/168; 95/149–240
See application file for complete search history.

(56) References Cited

U.S. PATENT DOCUMENTS

| | | | |
|---|---|---|---|
| 8,591,627 | B2 | 11/2013 | Jain |
| 10,500,540 | B2 | 12/2019 | Zehnacker et al. |
| 10,507,425 | B2 | 12/2019 | Henson et al. |
| 10,668,428 | B2 | 6/2020 | Weng et al. |

(Continued)

FOREIGN PATENT DOCUMENTS

| | | |
|---|---|---|
| CN | 104826455 A | 8/2015 |
| CN | 205948617 U | 2/2017 |
| CN | 113031682 A | 6/2021 |

OTHER PUBLICATIONS

Khan et al., "Probing the Interactions between Ionic Liquids and Water: Experimental and Quantum Chemical Approach," ACS Publications, The American Chemical Society, The Journal of Physical Chemistry, vol. 118, dx.doi.org/10.1021/jp4113552, pp. 1848-1860.

(Continued)

*Primary Examiner* — Jennifer Dieterle
*Assistant Examiner* — Rachel Marie Slaugovsky
(74) *Attorney, Agent, or Firm* — Shumaker & Sieffert, P.A.

(57) ABSTRACT

A contaminant removal system for removing contaminants from an environment includes a water management system and a carbon dioxide removal system. The water management system is configured to remove water from a cabin air stream using a first liquid sorbent to produce a dehumidified cabin air stream, and includes a water scrubber and a water stripper. The carbon dioxide removal system is configured to remove carbon dioxide from the dehumidified cabin air stream using a second liquid sorbent, and includes a carbon dioxide scrubber and a carbon dioxide stripper.

19 Claims, 4 Drawing Sheets

(56) References Cited

U.S. PATENT DOCUMENTS

| | | | |
|---|---|---|---|
| 10,688,435 B2 | 6/2020 | Henson et al. | |
| 11,033,855 B2 | 6/2021 | Feron et al. | |
| 11,123,685 B2 | 9/2021 | Isobe et al. | |
| 11,123,686 B2 | 9/2021 | Henson et al. | |
| 11,179,670 B2 | 11/2021 | Weng et al. | |
| 11,202,987 B2 | 12/2021 | Henson et al. | |
| 11,291,954 B2 | 4/2022 | Isobe et al. | |
| 11,292,600 B2 | 4/2022 | Kamire et al. | |
| 11,466,372 B2 | 10/2022 | Kamire et al. | |
| 2008/0112869 A1* | 5/2008 | MacKnight | B01D 53/0454 95/218 |
| 2016/0059212 A1 | 3/2016 | Watanabe et al. | |
| 2018/0243685 A1* | 8/2018 | Henson | B01D 53/22 |
| 2021/0061475 A1* | 3/2021 | Kamire | B01D 53/1487 |
| 2021/0146299 A1* | 5/2021 | Besarati | C25B 15/081 |
| 2022/0203292 A1* | 6/2022 | Lackner | C01B 32/50 |
| 2023/0295527 A1* | 9/2023 | Schmidt | C01B 3/52 95/174 |

OTHER PUBLICATIONS

Rogers et al., "Selection and Characterization of a Liquid Sorbent for CO2 Removal in Advanced Exploration Systems," 47th International Conference on Environmental Systems, Charleston, South Carolina, Jul. 16-20, 2017, 10 pp.

Yates et al., "Carbon Dioxide Removal by Ionic Liquid Sorbent (CDRILS) System Development," 48th International Conference on Environmental Systems, Albuquerque, New Mexico, Jul. 8-12, 2018, 15 pp.

* cited by examiner

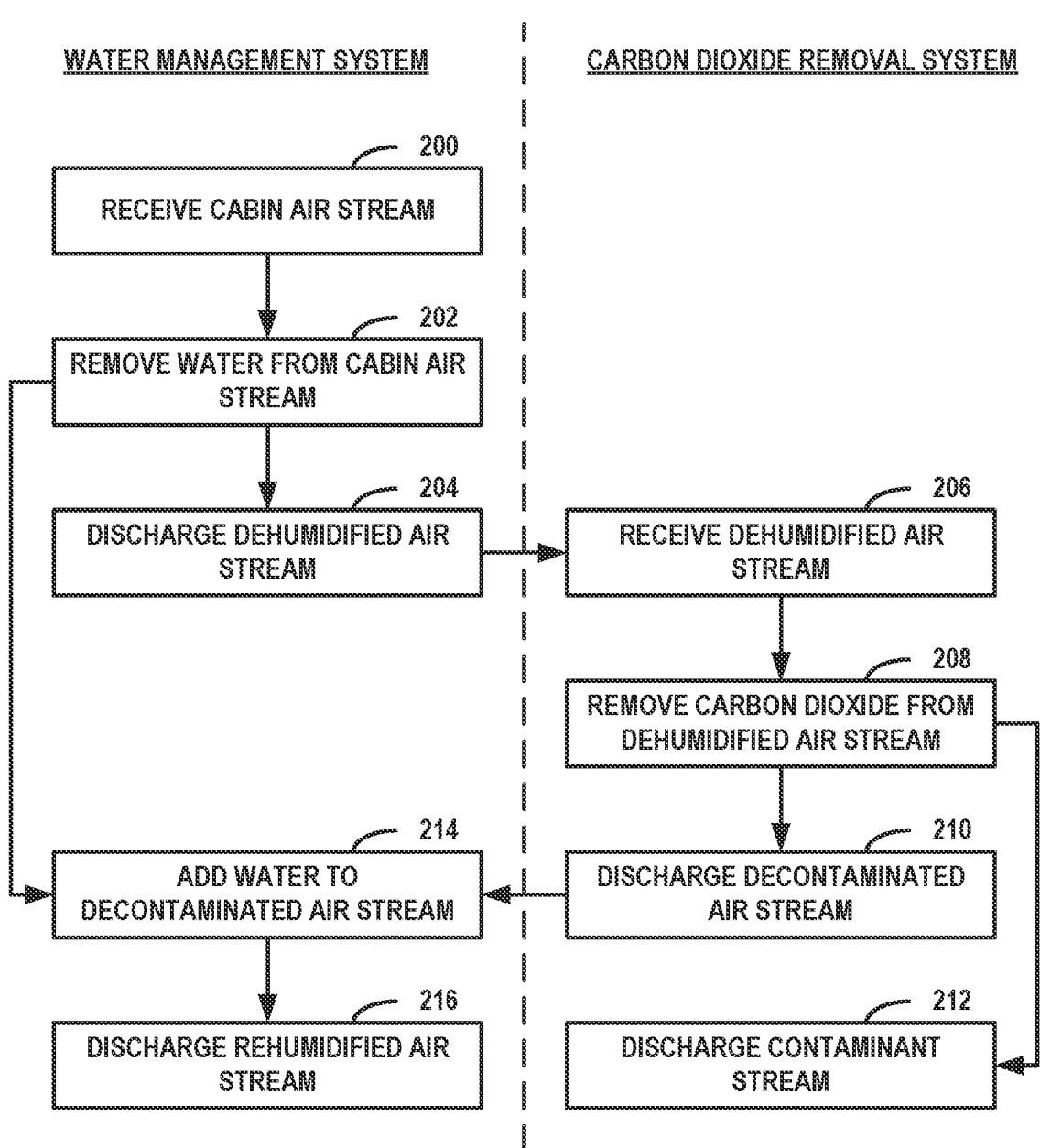

WATER MANAGEMENT SYSTEM                    CARBON DIOXIDE REMOVAL SYSTEM

200
RECEIVE CABIN AIR STREAM

202
REMOVE WATER FROM CABIN AIR STREAM

204
DISCHARGE DEHUMIDIFIED AIR STREAM

206
RECEIVE DEHUMIDIFIED AIR STREAM

208
REMOVE CARBON DIOXIDE FROM DEHUMIDIFIED AIR STREAM

214
ADD WATER TO DECONTAMINATED AIR STREAM

210
DISCHARGE DECONTAMINATED AIR STREAM

216
DISCHARGE REHUMIDIFIED AIR STREAM

212
DISCHARGE CONTAMINANT STREAM

FIG. 3

CONTAMINENT REMOVAL SYSTEM USING SEPARATE LIQUID SORBENT LOOPS

GOVERNMENT RIGHTS

This invention was made with Government support under Grant Contract Number 80MSFC18C0045 awarded by National Aeronautics and Space Administration (NASA) Marshall Space Flight Center. The Government has certain rights in the invention.

TECHNICAL FIELD

The present disclosure relates to systems and techniques for removing contaminants from an environment using contaminant removal systems.

BACKGROUND

An environmental control system (ECS) may provide conditioned air to a passenger cabin or other environment. Some of this conditioned air may be treated to remove contaminants. ECS components that are used to remove contaminants may be large and heavy, increasing an overall weight of the ECS, and may consume large amounts of power heating, cooling, and pressurizing various fluid streams.

SUMMARY

The disclosure describes systems and techniques for removing contaminants, including carbon dioxide and water, from cabin air using liquid sorbents, such as ionic liquid sorbents. A contaminant removal system includes a water management system and a carbon dioxide removal system to control a concentration of the respective contaminants using separate liquid sorbent loops. The carbon dioxide removal system removes carbon dioxide from the cabin air through absorption into a liquid sorbent. The efficiency of carbon dioxide removal and the reliability of components of the carbon dioxide removal system may be related to a concentration of water in the liquid sorbent, as a higher concentration of water in the liquid sorbent may increase an amount of power consumed by the carbon dioxide removal system, increase a load on a vacuum source used to desorb the carbon dioxide, and reduce a reliability of the vacuum source due to condensation of the water at the vacuum source.

Rather than directly supply the cabin air to the carbon dioxide removal system for carbon dioxide removal, the contaminant removal system includes the water management system upstream of the carbon dioxide removal system to control a concentration of water in the cabin air prior to supplying the cabin air to the carbon dioxide removal system. The water management system removes water from the cabin air by absorption of the water into a liquid sorbent and returns at least a portion of the water to the treated, decontaminated air to maintain the humidity of air supplied to the cabin. The liquid sorbent may more readily remove water vapor than carbon dioxide, such that most or all of the water may be removed from the air stream, thereby reducing an amount of water absorbed by the liquid sorbent of the carbon dioxide removal system. In some examples, such as with carbon dioxide removal systems that use a liquid sorbent having a high concentration of water, the water management system may add water from the scrubber air exhaust to the cabin air before it enters the scrubber to retain water in the carbon dioxide removal system. In some instances, the liquid sorbent used to remove the water in the water management system may be selected to have a higher affinity for water than the liquid sorbent used to remove carbon dioxide in the carbon dioxide removal system, and/or may remove other gaseous contaminants from the cabin air, such as ammonia.

As a result, the carbon dioxide removal system may have a reduced size, and/or use a reduced amount of power than a contaminant removal system that does not use separate liquid sorbent loops to remove the water and carbon dioxide. This reduced size, weight, and/or power consumption of the carbon dioxide removal system may offset any increase in size, weight, and/or power consumption from the relatively small components of the water management system, resulting in an overall smaller, lighter, and/or more efficient contaminant removal system.

In some examples, the disclosure describes a contaminant removal system for removing contaminants from an environment. The contaminant removal system includes a water management system and a carbon dioxide removal system. The water management system is configured to remove water from a cabin air stream using a first liquid sorbent to produce a dehumidified cabin air stream, and includes a water scrubber and a water stripper. The carbon dioxide removal system is configured to remove carbon dioxide from the dehumidified cabin air stream using a second liquid sorbent, and includes a carbon dioxide scrubber and a carbon dioxide stripper.

In some examples, the disclosure describes a method for removing a contaminant from an environment that includes removing, by a water management system, water from a cabin air stream using a first liquid sorbent to produce a dehumidified cabin air stream. The water management system includes a water scrubber and a water stripper. The method further includes removing, by a carbon dioxide removal system, carbon dioxide from the dehumidified cabin air stream using a second liquid sorbent. The carbon dioxide removal system includes a carbon dioxide scrubber and a carbon dioxide stripper.

BRIEF DESCRIPTION OF THE FIGURES

The details of one or more examples are set forth in the accompanying drawings and the description below. Other features, objects, and advantages will be apparent from the description and drawings, and from the claims.

FIG. 3 is an example flowchart of a method for removing a contaminant from an environment.

DETAILED DESCRIPTION

The disclosure describes systems and techniques for removing contaminants, including carbon dioxide and water, from cabin air using liquid sorbents. Rather than remove both carbon dioxide and water using a single liquid sorbent loop, a contaminant removal system includes a water management system and a carbon dioxide removal system that include separate liquid sorbent loops to remove water in the water management system prior to removing carbon dioxide in the carbon dioxide removal system.

Contaminant removal systems described herein may be utilized as part of an environmental control system (ECS), such as in spacecraft, aircraft, watercraft, and the like. In some examples, contaminant removal systems may be used in an ECS of a resource-limited environment, such as a passenger cabin of a spacecraft, in which carbon dioxide and water may be recycled to produce oxygen gas, water, methane, hydrogen gas, and a variety of other compounds used in life support systems. Such resource-limited environments may be particularly suited for a contaminant removal system that includes components that use low amounts of power and have extended service lives to reduce overall weight, power consumption, and maintenance load.

Figure 1:
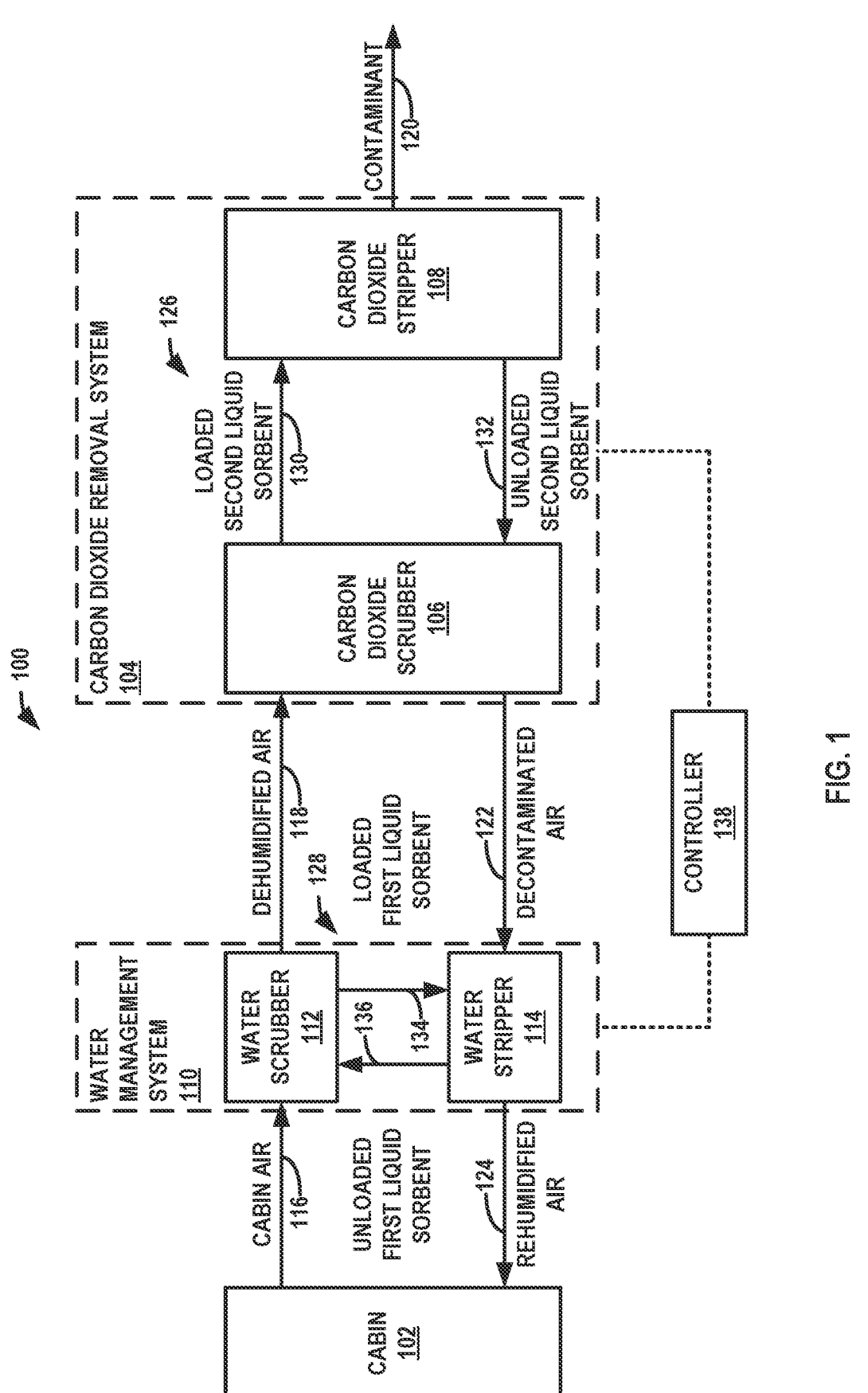
FIG. 1 is a block diagram illustrating an example contaminant removal system for removing water and carbon dioxide from a cabin air stream using liquid sorbents.

FIG. 1 is a block diagram illustrating an example contaminant removal system 100 for removing water and carbon dioxide from a cabin air stream using liquid sorbents. Contaminant removal system 100 is configured to remove contaminants from a cabin 102. Cabin 102 may be a controlled environment, such as an aircraft cabin, spacecraft cabin, watercraft cabin, or the like, and contaminants removed from cabin 102 may include, but are not limited to, carbon dioxide, water, hydrocarbons, permanent gases, or the like. In the example of FIG. 1, cabin 102 is a cabin of a closed-loop system, such as a spacecraft cabin or submarine cabin, in which components of a cabin air stream from cabin 102, such as carbon dioxide and water, may be removed within contaminant removal system 100, allowing a purified supply air stream to be generated and carbon dioxide and water to be recovered. However, in other examples, cabin 102 may be a cabin of an open-loop system, such as an aircraft cabin, in which components of a cabin air stream may be removed to generate a purified supply air stream with only partial or no subsequent recovery of the contaminants.

System 100 is configured to remove the contaminants using liquid sorbents. A liquid sorbent may include any liquid configured to absorb and desorb a gaseous species. Liquid sorbents may be water soluble, hygroscopic (i.e., capable of absorbing moisture from the air), capable of absorbing or desorbing contaminants in response to a change in solubility driven by a change in temperature, and/or capable of releasing water by evaporation, such as by elevating the temperature or reducing the water partial pressure. In some examples, the liquid sorbent may be an ionic liquid sorbent. Ionic liquid sorbents may be salts that are generally comprised of an anion and an organic cation. These salts may be liquid at their temperature of use, have effectively zero vapor pressure, be generally nontoxic, and/or have sufficient stability to resist deterioration. In some examples, ionic liquid sorbents may contain relatively large organic cations and any of a variety of anions, which may be tailored to obtain desired characteristics, such as characteristics that improve absorption of the particular contaminant under operating conditions of contaminant removal system 100. A variety of ionic liquid sorbents may be used including, but not limited to, imidazole salts, such as 1-ethyl-3-methylimidazolium (EMIM) acetate (Ac).

In system 100, each of the liquid sorbents for a carbon dioxide removal system 104 and a water management system 110 is dissolved in water to form a liquid sorbent mixture. A concentration of liquid sorbent in each of the liquid sorbent mixtures may be sufficiently high to remove the particular contaminant and sufficiently low that the liquid sorbent remains in solution through operating ranges (e.g., temperature range, pH range) and/or maintains a low viscosity for maintaining high mass transfer. In some examples, the liquid sorbent mixture may further include a dissolved promoter. The promoter may be configured to increase a rate of removal of a contaminant, such as water or carbon dioxide, from an air stream. For example, the promoter may be configured to reduce a viscosity of the liquid sorbent, change a pH of the liquid sorbent, increase a thermal stability of the liquid sorbent, increase a capacity of the liquid sorbent for the contaminant, or increase an absorption rate of the contaminant into the liquid sorbent.

Liquid sorbents may be used with membrane contactors, such as scrubbers, that contact an air stream with the liquid sorbent across one or more hydrophobic porous membranes. Absorption of the contaminants by the liquid sorbent may be determined by a concentration of the contaminants in the corresponding air stream. In general, a concentration of water in an air stream from human occupied environments may be substantially higher than a concentration of carbon dioxide or other gaseous contaminants. As a result, absorption of water vapor from the air stream into the liquid sorbent is higher than absorption of carbon dioxide from the air stream.

A capacity of the liquid sorbent for a particular contaminant may be affected by a concentration of the liquid sorbent in the liquid sorbent mixture. For example, as a concentration of the liquid sorbent in the liquid sorbent mixture decreases, an amount of carbon dioxide that may be absorbed by the liquid sorbent may decrease. Further, a higher amount of water in the liquid sorbent mixture may increase an amount of power required to remove the water through evaporation or reduce a service life of components, such as a vacuum pump, that generate a vacuum on the membrane contactor.

System 100 includes water management system 110 configured to remove a portion of water vapor or other gaseous contaminants in a cabin air stream 116 prior to primary removal of carbon dioxide and subsequently add a portion of the removed water to decontaminated air supplied to cabin 102 to maintain the humidity of cabin 102 and/or maintain a water concentration in carbon dioxide removal system 104. By removing at least a portion of the water in cabin air stream 116 prior to carbon dioxide removal, components of carbon dioxide removal system 104 may remove carbon dioxide more efficiently and/or reliably.

Water management system 110 is configured to remove water from cabin air stream 116 using a first liquid sorbent. Water management system 110 includes at least one water scrubber 112 and at least one water stripper 114 configured to contact various air streams with the first liquid sorbent across one or more hydrophobic membranes. Water scrubber 112 is configured to absorb water from cabin air stream 116 into the first liquid sorbent and discharge a dehumidified air stream 118 having a lower humidity than cabin air stream 116 to carbon dioxide removal system 104. Water stripper 114 is configured to desorb water from the first liquid sorbent into a decontaminated air stream 122 and discharge a rehumidified air stream 124 having a higher humidity to cabin 102. A first liquid sorbent loop 128 circulates a loaded first liquid sorbent stream 134 from water scrubber 112 to water stripper 114 and an unloaded first liquid sorbent stream 136 from water stripper 114 to water scrubber 112.

The first liquid sorbent may be selected for a variety of properties related to contact with a hydrophobic membrane and absorption of water including, but not limited to, a high affinity for water, a high capacity for water, a low viscosity, and a high stability. While water scrubber 112 may absorb, and water stripper 114 desorb, a portion of carbon dioxide from cabin air stream 116 and into decontaminated air stream 122, such a portion may be negligible due to the substantially higher affinity of the first liquid sorbent for water than carbon dioxide. The capacity of the liquid does impact the rate, but the rate is also driven by 1) porosity of the membrane, 2) specific interactions of the contaminant with something in the liquid (like promoter), 3) diffusion rate within the liquid, and 4) gas side diffusion and mass transfer.

In some examples, water management system 110 may be configured to assist in controlling a concentration of other gaseous trace contaminants other than carbon dioxide in rehumidified air stream 124. For example, water management system 110 may be configured to absorb one or more gaseous species, such as ammonia, that would otherwise be absorbed by the second liquid sorbent in carbon dioxide scrubber 106. Cabin 102 or other environments may include systems that remove trace contaminants that are bioeffluents from a crew and/or off-gassed trace contaminants from equipment. Such trace contaminants may include, but are not limited to, halogens, such as dichloromethane and freon, sulfur-containing compounds, such as dimethyl sulfone, and silicone-containing compounds, such as siloxanes and trimethylsilanol. The first liquid sorbent may have properties, such as acidity, that may enable the first liquid sorbent to have an increased capacity for other contaminants, such as ammonia gas.

As described above, liquid sorbents, including the first liquid sorbent, have a high affinity for water in addition to carbon dioxide. To absorb a particular amount of water from cabin air stream 116, water scrubber 112 and water scrubber 112 may have a relatively small surface area due to the high affinity, and correspondingly high kinetics and/or capacity, of the water into the first liquid sorbent. As a result, water scrubber 112 and water stripper 114 may be substantially smaller than carbon dioxide scrubber 106 and carbon dioxide stripper 108.

Carbon dioxide removal system 104 is configured to remove carbon dioxide from dehumidified air stream 118 using a second liquid sorbent. Carbon dioxide removal system 104 includes at least one carbon dioxide scrubber 106 and at least one carbon dioxide stripper 108. Carbon dioxide scrubber 106 is configured to absorb carbon dioxide from dehumidified air stream 118 into the second liquid sorbent and discharge decontaminated air stream 122 having a lower concentration of carbon dioxide than dehumidified air stream 118 to water management system 110 for humidification. Carbon dioxide stripper 108 is configured to desorb carbon dioxide from the second liquid sorbent into a contaminant stream 120 for discharge, storage, or further processing. A second liquid sorbent loop 126 circulates a loaded second liquid sorbent stream 130 from carbon dioxide scrubber 106 to carbon dioxide stripper 108 and an unloaded second liquid sorbent stream 132 from carbon dioxide stripper 108 to carbon dioxide scrubber 106.

The second liquid sorbent may be selected for a variety of properties related to contact with a hydrophobic membrane and absorption of carbon dioxide including, but not limited to, a high capacity for carbon dioxide, a low viscosity, and a high stability. While the second liquid sorbent may have a similar affinity to water and carbon dioxide, removal of water from cabin air stream 116 by water management system 110 may limit an amount of water that is absorbed into the second liquid sorbent. The second liquid sorbent may absorb other gaseous contaminants, such as hydrocarbons, that may not be removed from cabin air stream 116 by water management system 110.

Contaminant removal system 100 may include a process control system that includes a controller 138 and one or more sensor sets (not shown). Controller 138 may include any of a wide range of devices, including control circuitry, processors (e.g., one or more microprocessors, one or more application specific integrated circuits (ASICs), one or more field programmable gate arrays (FPGAs), or the like), processing circuitry, one or more servers, one or more desktop computers, one or more notebook (i.e., laptop) computers, one or more cloud computing clusters, or the like.

Controller 138 may be configured to receive measurements from the one or more sensor sets and/or components of contaminant removal system 100 and/or send control signals to components of contaminant removal system 100. Controller 138 may be communicatively coupled to and configured to receive measurement signals from the one or more sensor sets, and other process control components (not shown) of contaminant removal system 100, such as: control valves for various streams; pumps; heaters; heat exchangers; compressors; and the like. The sensor sets may include instrumentation configured to detect any of a pressure, temperature, flow rate, and/or contaminant concentration (e.g., carbon dioxide concentration or water concentration) of a liquid or gas stream of contaminant removal system 100. Controller 138 may be configured to use the detected conditions to control operation of contaminant removal system 100 to function as described in the application.

Controller 138 is configured to control conditions within water scrubber 112, water stripper 114, carbon dioxide scrubber 106, and/or carbon dioxide stripper 108. For example, as will be described further below, controller 138 may be configured to control condition at water scrubber 112 to control a humidity of dehumidified air stream 118 to compensate for water losses at carbon dioxide stripper 108; control conditions at water stripper 114 to control a humidity of rehumidified air stream 122 to maintain a humidity in cabin 102; control conditions at carbon dioxide scrubber 106 to control a concentration of carbon dioxide in cabin 102 below a threshold; and/or control conditions at carbon dioxide stripper 108 to control an amount (e.g., concentration and/or flow rate) of carbon dioxide in contaminant stream 120.

Controller 138 is configured to control a concentration of carbon dioxide within the environment of cabin 102. For example, controller 138 may be configured to receive a concentration measurement for carbon dioxide, such as from a cabin air sensor set or a carbon dioxide concentration sensor in cabin 102. Controller 138 may be configured to determine whether the concentration measurement of carbon dioxide exceeds a concentration setpoint. For example, the concentration setpoint may be a target concentration of rehumidified air stream 124 for maintaining cabin 102 below a threshold contaminant concentration. Controller 138 may be configured to send, in response to the concentration measurement of carbon dioxide exceeding the concentration setpoint, a control signal to decrease a concentration of carbon dioxide in rehumidified air stream 124. For example, controller 138 may send a control signal to control a flow rate of the second liquid sorbent mixture; a flow rate, humidity, and/or temperature of a sweep gas stream (not shown) into carbon dioxide stripper 108; a temperature of the second liquid sorbent mixture at carbon dioxide scrubber 106 or carbon dioxide stripper 108; a flow rate of cabin air stream 116; or any other variable that may control a rate of removal of carbon dioxide from cabin air stream 116.

In addition to controlling a concentration of carbon dioxide, controller 138 is configured to control a concentration of water (or humidity) within the environment of cabin 102. For example, controller 138 may be configured to receive a humidity measurement, such as from a cabin air sensor set or a humidity concentration sensor in cabin 102. Controller 138 may be configured to determine whether the humidity measurement exceeds a maximum or minimum humidity setpoint. For example, the humidity setpoint may be a target humidity of rehumidified air stream 124 for maintaining cabin 102 within a humidity range, such as a target humidity range for passenger comfort between about 5% and about 75% relative humidity. Controller 138 may be configured to send, in response to the humidity measurement being outside a humidity range setpoint, a control signal to change a humidity in rehumidified air stream 124. For example, controller 138 may send a control signal to control a flow rate of the first liquid sorbent mixture; a temperature of the first liquid sorbent mixture at water scrubber 112 and/or water stripper 114; a flow rate of cabin air stream 116; or any other variable that may control a rate of removal of water vapor from cabin air stream 116.

In some examples, controller 138 is configured to control a water content of the second liquid sorbent in second liquid sorbent loop 126. For example, a portion of water in the second liquid sorbent mixture may be desorbed at carbon dioxide stripper 108 into contaminant stream 120. Without replacement of the desorbed water, a viscosity of the second liquid sorbent mixture may increase, thereby reducing mass transfer of carbon dioxide into the second liquid sorbent. To replace the desorbed water, controller 138 may be configured to determine whether a concentration of water, or a related parameter such as concentration of liquid sorbent, in the second liquid sorbent mixture is outside a concentration range setpoint. For example, the concentration range setpoint may be the target concentration range of water in the second liquid sorbent mixture in second liquid sorbent loop 126 for efficiently absorbing and desorbing carbon dioxide while maintaining a sufficiently low viscosity. Controller 138 may be configured to receive a concentration measurement, such as from a concentration sensor fluidically coupled to dehumidified air stream 118, loaded second liquid sorbent stream 130, or unloaded second liquid sorbent stream 132, and send, in response to the concentration measurement being outside the concentration range setpoint, a control signal to change the humidity of dehumidified air stream 118. For example, controller 138 may send a control signal to control a flow rate of the first liquid sorbent mixture; a temperature of the first liquid sorbent mixture at water scrubber 112 and/or water stripper 114; a flow rate of cabin air stream 116; a temperature of the second liquid sorbent mixture at carbon dioxide scrubber 106 and/or carbon dioxide stripper 108; a flow rate of the second liquid sorbent mixture; or any other variable that may control a rate of removal of water vapor from cabin air stream 116.

Figure 2A:
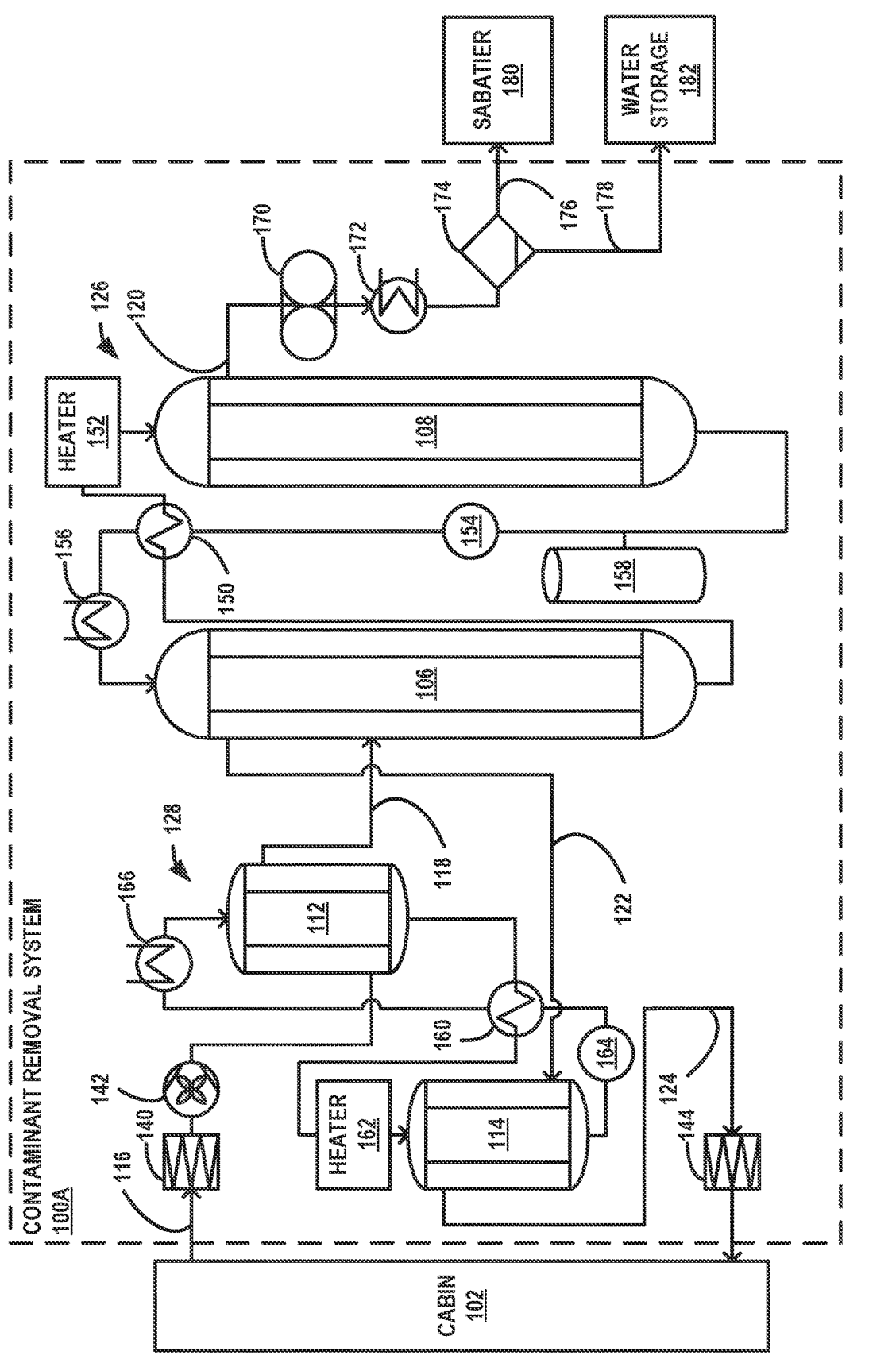
FIG. 2A is a schematic diagram illustrating an example contaminant removal system for removing water and carbon dioxide from a cabin air stream using liquid sorbents.

FIG. 2A is a schematic diagram illustrating example contaminant removal system 100A for removing water and carbon dioxide from cabin air stream 116 using first and second liquid sorbents. In the example of FIG. 2A, cabin 102 may be a cabin of a closed-loop system, such as a spacecraft cabin or submarine cabin, in which components of cabin air stream 116 from cabin 102, such as carbon dioxide and water, may be removed within contaminant removal system 100A, allowing a purified rehumidified air stream 124 to be generated. In some examples, cabin air stream 116 may have a carbon dioxide concentration between about 1000 ppm and about 5000 ppm and/or a hydrocarbon concentration less than about 100 ppm. Rehumidified air stream 124 has a lower concentration of carbon dioxide than cabin air stream 116. For example, rehumidified air stream 124 may have a concentration of carbon dioxide that is about 25% to about 99% less than a concentration of carbon dioxide in cabin air stream 116, such as about 40% to about 95% less than the concentration of carbon dioxide in cabin air stream 116, or such as about 60% to about 80% less than the concentration of carbon dioxide in cabin air stream 116.

Contaminant removal system 100A includes a cabin air circuit (not labeled) configured to circulate cabin air between cabin 102, water management system 110, and carbon dioxide removal system 104. In the example of FIG. 1, cabin air stream 116 includes a filter 140 configured to remove particulates from cabin air stream 116 prior to entry into water scrubber 112 and/or carbon dioxide scrubber 106 and a blower 142 configured to draw cabin air into water scrubber 112, while rehumidified air stream 124 includes a filter 144 configured to remove any leaked liquid sorbent and/or further filter clean air from rehumidified air stream 124 prior to entry into cabin 102.

Water management system 110 includes first liquid sorbent loop 128 configured to circulate the first liquid sorbent between water scrubber 112 and water stripper 114. For example, a pump 164 may pump unloaded first liquid sorbent from water stripper 114 into water scrubber 112. Unloaded liquid sorbent may include unused liquid sorbent free of contaminants or regenerated liquid sorbent having a lower concentration of contaminants than the loaded liquid sorbent.

In some examples, first liquid sorbent loop 128 is configured to control a temperature of the first liquid sorbent to control an amount of water absorbed at water scrubber 112 and/or an amount of water desorbed at water stripper 114. First liquid sorbent loop 128 may include a cooler 166, a heat exchanger 160, and a heater 162. The unloaded liquid sorbent may be cooled by a cooler 166 and/or heat exchanger 160 prior to entry into water scrubber 112. For example, the first liquid sorbent may have an increased capacity for water at a lower temperature, such that the first liquid sorbent may absorb a greater amount of water before reaching equilibrium. The loaded liquid sorbent may be preheated by heat exchanger 160 and/or heater 162 prior to entry into water stripper 114. For example, the first liquid sorbent may have a reduced capacity for water at a higher temperature, such that the first liquid sorbent may desorb a greater amount of water before reaching equilibrium. Heat exchanger 160 may be a recuperative heat exchanger configured to heat relatively cool first liquid sorbent discharged by water scrubber 112 using relatively warm first liquid sorbent discharged by water stripper 114.

Water scrubber 112 is configured to absorb water vapor, and optionally one or more other contaminant species, in the cabin air into the first liquid sorbent. On a gas phase side, water scrubber 112 is configured to receive cabin air from cabin air stream 116 that includes contaminant species from cabin 102, such as carbon dioxide, water, hydrocarbon volatiles, permanent gases, and other gaseous substances. Water scrubber 112 includes one or more separation membranes, each configured to flow (e.g., provide or direct flow of) cabin air from cabin air stream 116 on a gas phase side (e.g., a tube side) of the respective membrane and flow the first liquid sorbent on a liquid phase side (e.g., a shell side) of the membrane. Water vapor and various gaseous species may pass through the membrane due to a concentration gradient between the cabin air and the first liquid sorbent and become absorbed by the first liquid sorbent, while the first liquid sorbent may not substantially flow through the membrane. As a result, dehumidified air from dehumidified air stream 118 discharged from water scrubber 112 may have a lower humidity than cabin air from cabin air stream 116 received by water scrubber 112. For example, a dehumidified air stream 118 may have a humidity that is between about 0% and about 35% relative humidity. Water scrubber 112 is configured to discharge dehumidified air stream 118 to carbon dioxide scrubber 106. On a liquid phase side, water scrubber 112 is configured to receive unloaded first liquid sorbent. The unloaded first liquid sorbent may flow through water scrubber 112 and absorb water and other gaseous species from cabin air through the membrane(s) of water scrubber 112. As a result, the loaded liquid sorbent discharged from water scrubber 112 may have a higher concentration of water and other gaseous contaminants than the unloaded first liquid sorbent received by water scrubber 112. Water scrubber 112 may discharge the loaded first liquid sorbent containing the water and other gaseous contaminants to water stripper 114.

Water stripper 114 is configured to desorb water from the first liquid sorbent into rehumidified air stream 124. On a liquid phase side, water stripper 114 is configured to receive loaded first liquid sorbent from water scrubber 112 and desorb water, and optionally one or more other gaseous contaminants, from the loaded first liquid sorbent. Water stripper 114 includes one or more membranes, each configured to flow the loaded first liquid sorbent on one side (e.g., a shell side) of the membrane and decontaminated air from decontaminated air stream 122 on an opposite side (e.g., a tube side) of the membrane. Water and other gaseous contaminants may flow across fibers of the membrane due to a concentration gradient, while the first liquid sorbent may not substantially flow across the fibers of the membrane. As a result, unloaded first liquid sorbent discharged from water stripper 114 may have a lower concentration of water and other contaminants than the loaded first liquid sorbent received by water stripper 114. On a gas phase side, water stripper 114 is configured to desorb the water and other gaseous species into decontaminated air stream 122 as rehumidified air stream 124. Rehumidified air stream 124 may have a higher humidity than the humidity of decontaminated air stream 122. For example, rehumidified air stream 124 may have a humidity that is selected to maintain a humidity of cabin 102 between about 5% and about 35% relative humidity.

Carbon dioxide removal system 104 includes second liquid sorbent loop 126 configured to circulate second liquid sorbent between carbon dioxide scrubber 106 and carbon dioxide stripper 108. For example, a pump 154 may pump unloaded liquid sorbent from carbon dioxide stripper 108 into carbon dioxide scrubber 106. Unloaded liquid sorbent may include unused liquid sorbent free of contaminants or regenerated liquid sorbent having a lower concentration of contaminants than the loaded liquid sorbent. In some examples, the unloaded liquid sorbent may be cooled by a cooler 156 prior to entry into carbon dioxide scrubber 106. In some examples, the loaded liquid sorbent may be preheated by a heat exchanger 150 and/or heater 152 prior to entry into carbon dioxide stripper 108. A liquid sorbent storage 158 may store liquid sorbent, such as in a relatively cool state.

Carbon dioxide scrubber 106 is configured to absorb carbon dioxide from dehumidified air stream 118 into the second liquid sorbent and discharge a decontaminated air stream 122 to water stripper 114. Decontaminated air stream 122 has a lower concentration of carbon dioxide than dehumidified air stream 118. For example, decontaminated air stream 122 may have a concentration of carbon dioxide that is about 25% to about 99% less than a concentration of carbon dioxide in dehumidified air stream 118.

Carbon dioxide scrubber 106 is configured to absorb carbon dioxide in the dehumidified air into the second liquid sorbent. On a gas phase side, carbon dioxide scrubber 106 is configured to receive dehumidified air from dehumidified air stream 118 that includes carbon dioxide from cabin 102. Carbon dioxide scrubber 106 includes one or more separation membranes, each configured to flow (e.g., provide or direct flow of) dehumidified air from dehumidified air stream 118 on a gas phase side (e.g., a tube side) of the respective membrane and flow the second liquid sorbent on a liquid phase side (e.g., a shell side) of the membrane. Contaminants may pass through the membrane due to a concentration gradient between the dehumidified air and the second liquid sorbent and become absorbed by the second liquid sorbent, while the second liquid sorbent may not substantially flow through the membrane. As a result, decontaminated air from decontaminated air stream 122 discharged from carbon dioxide scrubber 106 may have a lower concentration of carbon dioxide than dehumidified air from dehumidified air stream 118 received by carbon dioxide scrubber 106. Carbon dioxide scrubber 106 is configured to discharge decontaminated air stream 122 to water stripper 114. On a liquid phase side, carbon dioxide scrubber 106 is configured to receive unloaded second liquid sorbent, such as from liquid sorbent storage 158. The unloaded second liquid sorbent may flow through carbon dioxide scrubber 106 and absorb carbon dioxide and other gaseous contaminants from dehumidified air through the membrane(s) of carbon dioxide scrubber 106. As a result, the loaded second liquid sorbent discharged from carbon dioxide scrubber 106 may have a higher concentration of carbon dioxide than the unloaded second liquid sorbent received by carbon dioxide scrubber 106. Carbon dioxide scrubber 106 may discharge the loaded second liquid sorbent containing the carbon dioxide to carbon dioxide stripper 108.

Carbon dioxide stripper 108 is configured to desorb the carbon dioxide from the second liquid sorbent into contaminant stream 120. On a liquid phase side, carbon dioxide stripper 108 is configured to receive loaded second liquid sorbent from carbon dioxide scrubber 106 and desorb carbon dioxide from the loaded second liquid sorbent. Carbon dioxide stripper 108 includes one or more membranes, each configured to flow the loaded second liquid sorbent on one side (e.g., a shell side) of the membrane and contaminated air to contaminant stream 120 on an opposite side (e.g., a tube side) of the membrane. Carbon dioxide may flow across fibers of the membrane due to a concentration gradient, while the second liquid sorbent may not substantially flow across the fibers of the membrane. As a result, unloaded second liquid sorbent discharged from carbon dioxide stripper 108 may have a lower concentration of carbon dioxide than the loaded second liquid sorbent received by carbon dioxide stripper 108. On a gas phase side, carbon dioxide stripper 108 is configured to discharge the carbon dioxide in contaminant stream 120. Contaminant stream 120 may be continuously removed from carbon dioxide stripper 108 to assist migration of the carbon dioxide from the loaded second liquid sorbent into contaminant stream 120.

Water scrubber 112, water stripper 114, carbon dioxide scrubber 106, and/or carbon dioxide stripper 108 may include one or more membrane separators configured to flow air on a first side and flow liquid sorbent on a second, opposite side. For example, a membrane separator may include a plurality of parallel membrane contactors. In some examples, a membrane contactor may include a cylindrical module filled with parallel or woven hollow porous fibers forming a hydrophobic porous membrane. For example, dimensions of these hollow fibers could be less than about 3 mm, and the pore dimension could be less than about 2 microns. The high surface area of the hollow fiber membrane contactors enables a high mass transfer of contaminant gases, such as carbon dioxide and water, into the respective liquid sorbent using a relatively small system volume and weight. The material of the hollow fibers can be selected such that the liquid sorbent does not wet the pores, and the trans-membrane pressure is kept sufficiently low to prevent pore penetration. As a result, the membrane contactor may ensure that the liquid sorbent and gas stream do not need further separation, such that contaminant removal system 100A may act in a gravity-independent way without the use of moving parts. Fiber materials may include, but are not limited to, hydrophobic materials such as polypropylene, polyvinylidene fluoride, polysulfone, polyimide, polytetrafluoroethylene (PTFE), and the like. In some examples, a coating may be applied to reduce liquid flow through the pores. Coatings that may be used include, but are not limited to, PTFE, a crosslinked siloxane, perfluorinated polymers, functionalized nanoparticles, and the like to prevent liquid flow through the pores. While described in FIG. 2A as flowing through a "tube" side, liquid sorbent flow can be either on the "tube" side or the "shell" side, while gas is flowed on the opposite side.

In the example of FIG. 2A, contaminant removal system 100A may include one or more systems or components configured to further process contaminant stream 120. In some examples, contaminant removal system 100A includes a compressor 170, condenser 172, and water separator 174 configured to compress contaminant stream 120 and remove water from the compressed contaminant stream 120. For example, for carbon dioxide removed from contaminant removal system 100A to be stored or recycled, compressor 170, condenser 172, and water separator 174 may compress contaminant stream 120 to a high pressure and remove nearly all water from contaminant stream 120. In a life support application, a large amount of water may be present in cabin air stream 116. For example, the humidity in cabin air stream 116 may be much higher than that of carbon dioxide. Sabatier system 180 may require a water concentration of less than 2% to react hydrogen gas with carbon dioxide.

Compressor 170 is configured to compress contaminant stream 120. A variety of compressors may be used for compressor 170 including, but not limited to, centrifugal compressors, positive displacement compressors, and the like. Condenser 172 may be configured to cool contaminant stream 120 and condense water from contaminant stream 120. For example, condenser 172 may be coupled to a refrigeration system or other cooling system that circulates a cooling medium to cool contaminant stream 120. A variety of condensers may be used for condenser 172 including, but not limited to, shell and tube heat exchangers, plate-fin, surface coolers, heat pipes, thermoelectric devices, cooling jackets, and the like. Water separator 174 may be configured to remove water from contaminant stream 120, discharge a dehumidified contaminant stream 176 to Sabatier system 180, and discharge water condensate stream 178 to water storage 182. A variety of water separators may be used for water separator 174 including, but not limited to, static phase separators, capillary phase separator, membrane phase separators, centrifugal/rotary separators, and the like.

In some examples, carbon dioxide removal system 104 may be further configured to remove one or more trace contaminants other than water and carbon dioxide from cabin air stream 116. For example, the one or more trace contaminants may absorb into first liquid sorbent and/or second liquid sorbent. The contaminants may accumulate in the liquid sorbents until the liquid sorbent is replaced or regenerated at carbon dioxide stripper 108 for the second liquid sorbent. For example, the one or more trace contaminants may be desorbed by carbon dioxide stripper 108 and discharged to contaminant stream 120, where the one or more contaminants may be further discharged into dehumidified contaminant stream 176 and/or water condensate stream 178.

Controller 138 (not shown) may be communicatively coupled to and configured to receive measurement signals from one or more sensor sets, and other process control components (not shown) of contaminant removal system 100A, such as: control valves for cabin air stream 116, dehumidified air stream 118, decontaminated air stream 122, rehumidified air stream 124, contaminant stream 120, and inlets/outlets to heat exchangers 150 and 160, heaters 152 and 162, liquid sorbent storage 158, and coolers 156 and 166; pumps 154 and 164; blower 142, compressor 170 (e.g., pumping speed); and the like.

Figure 2B:
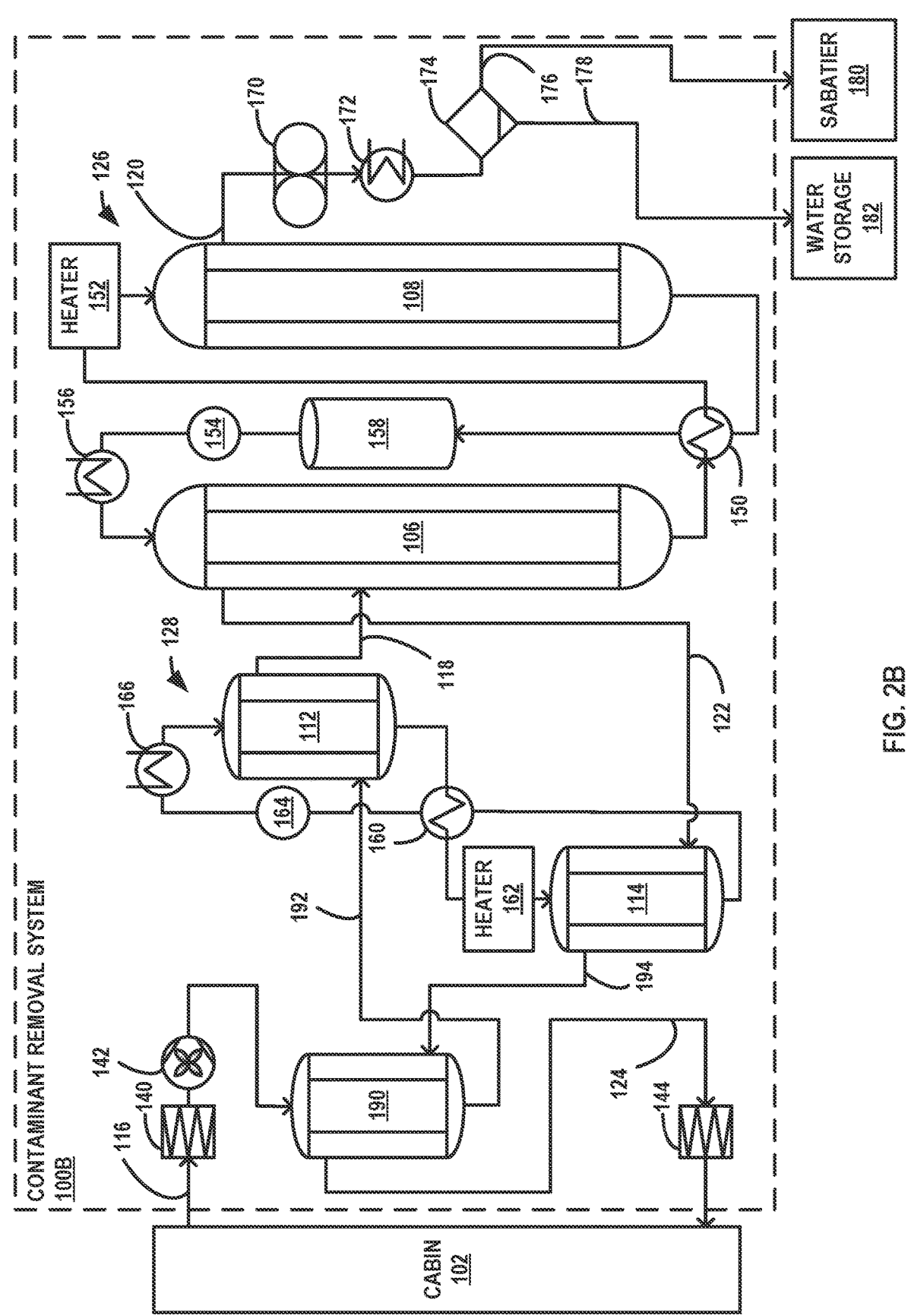
FIG. 2B is a schematic diagram illustrating an example contaminant removal system for removing water and carbon dioxide from a cabin air stream using liquid sorbents and a membrane dehumidifier.

FIG. 2B is a schematic diagram illustrating an example contaminant removal system 100B for removing water and carbon dioxide from cabin air stream 116 using liquid sorbents and membrane dehumidifier 190. Except as indicated below, components of contaminant removal system 100B may be similar to similarly labeled contaminant removal system 100A of FIG. 2A.

Water removed by water stripper 114 may require power due to control of temperature and flow of the first liquid sorbent. To reduce an amount of power used to remove water at water stripper 114 and/or a size of water stripper 114, water management system 110 may include membrane dehumidifier 190. Membrane dehumidifier 190 is configured to return humidity from cabin air stream 116 to decontaminated air stream 122 and discharge at least partially dehumidified air to water stripper 114. On one side, dehumidifier 190 is configured to receive cabin air stream 116 as a feed gas stream and discharge cabin air in a partially dehumidified air stream 192 to water scrubber 112 having a lower humidity. On an opposite side, dehumidifier 190 is configured to receive a partially rehumidified air stream 194 from water stripper 114 and discharge rehumidified air to rehumidified air stream 124 having a higher humidity.

By capturing humidity from cabin air prior to entry of cabin air from cabin air stream 116 into water scrubber 112, a greater amount of water may be removed from cabin air stream prior to being received by carbon dioxide stripper 108 and/or a reduced amount of power may be used to remove water from cabin air stream 116 by water management system 110. Membrane dehumidifier 190 may operate with relatively low power (e.g., power to pump gases or liquids). Removing water prior to going through water scrubber 112 may result in less excess water that is absorbed into the first liquid sorbent. This water removal may allow for smaller sizing of water scrubber 112 and/or water stripper 114, and/or a smaller load on heater 162, cooler 156, and pump 164. This water removal may also result in less water becoming absorbed into the second liquid sorbent and, correspondingly, less water to be removed, such that a load of compressor 170 may be decreased.

FIG. 3 is an example flowchart of a method for removing a contaminant from an environment. FIG. 3 will be described with respect to contaminant removal system 100 of FIG. 1; however, the technique of FIG. 3 may be utilized with other contaminant removal systems. The example of FIG. 3 includes receiving, by water management system 110, a cabin air stream 116 from an environment, such as cabin 102 (200). For example, controller 138 may detect that cabin air stream 116 has a concentration of one or more contaminants that is above a threshold and, in response, control components of the cabin air circuit to control a flow rate of cabin air stream 116.

The example of FIG. 3 includes removing water from cabin air stream 116 (202). Removing water from cabin air stream 116 may include absorbing, by water scrubber 112, a portion of water vapor from cabin air stream 116 into the first liquid sorbent. For example, controller 138 may control components of first liquid sorbent loop 128 to control a flow rate of the first liquid sorbent between water scrubber 112 and water stripper 114 and a temperature of the first liquid sorbent prior to entry into water scrubber 112. The example of FIG. 3 includes discharging, by water management system 110, dehumidified air stream 118 to carbon dioxide removal system 104 (204). A concentration of water in dehumidified air stream 118 may be lower than a concentration of water in cabin air stream 116. In some examples, a concentration of water in dehumidified air stream 118 may be controlled to maintain a desired water content of the second liquid sorbent mixture in second liquid sorbent loop 126.

The example of FIG. 3 includes receiving, by carbon dioxide removal system 104, dehumidified air stream 118 (206). The example of FIG. 3 includes removing, by carbon dioxide removal system 104, carbon dioxide from dehumidified air stream 118 (208). Removing carbon dioxide from dehumidified air stream 118 may include absorbing, by carbon dioxide scrubber 106, a portion of carbon dioxide from dehumidified air stream 118 into the second liquid sorbent. For example, controller 138 may control components of second liquid sorbent loop 126 to control a flow rate of the second liquid sorbent between carbon dioxide scrubber 106 and carbon dioxide stripper 108 and a temperature of the second liquid sorbent prior to entry into carbon dioxide scrubber 106. The example of FIG. 3 includes discharging, by carbon dioxide removal system 104, decontaminated air stream 122 (210).

The example of FIG. 3 includes discharging, by carbon dioxide removal system 104, contaminant stream 120 that includes carbon dioxide (212). Discharging contaminant stream 120 may include desorbing, by carbon dioxide stripper 108, the carbon dioxide and other contaminants from the second liquid sorbent to produce contaminant stream 120. For example, controller 138 may control components of second liquid sorbent loop 126 to control a flow rate of the second liquid sorbent between scrubber 106 and stripper 108 and a temperature of the second liquid sorbent prior to entry into stripper 108. Contaminant stream 120 may be stored or further processed, such to produce hydrocarbons using Sabatier system 180 of FIG. 2A or 2B.

The example of FIG. 3 includes adding, by water management system 110, water to decontaminated air stream 122 (214). Adding water to decontaminated air stream 122 may include desorbing, by water stripper 114, a portion of the water from the second liquid sorbent to produce rehumidified air stream 124. For example, controller 138 may control components of first liquid sorbent loop 128 to control a flow rate of the first liquid sorbent between water scrubber 112 and water stripper 114 and a temperature of the first liquid sorbent prior to entry into water stripper 114. The example of FIG. 3 includes discharging, by water management system 110, rehumidified air stream 124 to cabin 102.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Example 1: A contaminant removal system includes a water management system configured to remove water from a cabin air stream using a first liquid sorbent, wherein the water management system comprises a water scrubber and a water stripper; and a carbon dioxide removal system configured to remove carbon dioxide from a dehumidified cabin air stream using a second liquid sorbent, wherein the carbon dioxide removal system comprises a carbon dioxide scrubber and a carbon dioxide stripper.

Example 2: The contaminant removal system of example 1, wherein the water scrubber is configured to absorb water from the cabin air stream into the first liquid sorbent, and wherein the water stripper is configured to desorb water from the first liquid sorbent into a decontaminated air stream.

Example 3: The contaminant removal system of any of examples 1 and 2, wherein the first liquid sorbent has a higher capacity for water than the second liquid sorbent.

Example 4: The contaminant removal system of any of examples 1 through 3, wherein the first liquid sorbent is an ionic liquid sorbent.

Example 5: The contaminant removal system of any of examples 1 through 4, wherein the water management system is further configured to remove one or more trace contaminants other than water or carbon dioxide from the cabin air stream, and wherein the removed one or more trace contaminants are at least one of: accumulated in the respective first or second liquid sorbent; or desorbed from the second liquid sorbent and discharged to a contaminant stream.

Example 6: The contaminant removal system of any of examples 1 through 5, wherein each of the water scrubber and the water stripper comprises a hollow fiber membrane contactor that includes one or more hydrophobic porous membranes.

Example 7: The contaminant removal system of any of examples 1 through 6, wherein the water management system further comprises a membrane dehumidifier configured to remove water from the cabin air stream prior to the water scrubber.

Example 8: The contaminant removal system of any of examples 1 through 7, wherein the water management system further comprises: a heater configured to heat the first liquid sorbent upstream of the water stripper; and a cooler configured to cool the first liquid sorbent upstream of the water scrubber.

Example 9: The contaminant removal system of any of examples 1 through 8, wherein the water management system further comprises a heat exchanger configured to heat relatively cool first liquid sorbent discharged by the water scrubber using relatively warm first liquid sorbent discharged by the water stripper.

Example 10: The contaminant removal system of any of examples 1 through 9, wherein the carbon dioxide scrubber is configured to absorb carbon dioxide from a dehumidified air stream into the second liquid sorbent, and wherein the carbon dioxide stripper is configured to desorb carbon dioxide from the second liquid sorbent into a contaminant stream.

Example 11: A method for removing contaminants from an environment includes removing, by a water management system, water from a cabin air stream using a first liquid sorbent to produce a dehumidified cabin air stream, wherein the water management system comprises a water scrubber and a water stripper; and removing, by a carbon dioxide removal system, carbon dioxide from the dehumidified cabin air stream using a second liquid sorbent, wherein the carbon dioxide removal system comprises a carbon dioxide scrubber and a carbon dioxide stripper.

Example 12: The method of example 11, wherein removing the water comprises: absorbing, by the water scrubber, the water from the cabin air stream into the first liquid sorbent, and desorbing, by the water stripper, the water from the first liquid sorbent into a decontaminated air stream.

Example 13: The method of any of examples 11 and 12, wherein the first liquid sorbent has a higher capacity for water than the second liquid sorbent.

Example 14: The method of any of examples 11 through 13, wherein the first liquid sorbent is an ionic liquid sorbent.

Example 15: The method of any of examples 11 through 14, further includes removing, by at least one of the water management system or the carbon dioxide removal system, one or more trace contaminants other than water or carbon dioxide from the cabin air stream, wherein the removed one or more trace contaminants are at least one of: accumulated in the respective first or second liquid sorbent; or desorbed from the second liquid sorbent and discharged to a contaminant stream.

Example 16: The method of any of examples 11 through 15, wherein each of the water scrubber and the water stripper comprises a hollow fiber membrane separator that includes one or more hydrophobic porous membranes.

Example 17: The method of any of examples 11 through 16, further comprising removing, by a membrane dehumidifier, water from the cabin air stream prior to the water scrubber.

Example 18: The method of any of examples 11 through 17, further includes heating, by a heater, the first liquid sorbent upstream of the water stripper; and cooling, by a cooler, the first liquid sorbent upstream of the water scrubber.

Example 19: The method of any of examples 11 through 18, further comprising heating, by a heat exchanger, relatively cool first liquid sorbent discharged by the water scrubber using relatively warm first liquid sorbent discharged by the water stripper.

Example 20: The method of any of examples 11 through 19, absorbing, by the carbon dioxide scrubber, carbon dioxide from a dehumidified air stream into the second liquid sorbent, and desorbing, by the carbon dioxide stripper, carbon dioxide from the second liquid sorbent into a contaminant stream.

Various examples have been described. These and other examples are within the scope of the following claims.

What is claimed is:

1. A contaminant removal system, comprising:
a water management system configured to remove water from a cabin air stream using a first liquid sorbent, wherein the water management system comprises;
a water scrubber configured to absorb water from the cabin air stream into the first liquid sorbent; and
a water stripper configured to desorb water from the first liquid sorbent into a decontaminated air stream; and
a carbon dioxide removal system configured to remove carbon dioxide from a dehumidified air stream using a second liquid sorbent, wherein the carbon dioxide removal system comprises:
a carbon dioxide scrubber configured to:
receive the dehumidified air stream from the water scrubber;
absorb carbon dioxide from the dehumidified air stream into the second liquid sorbent; and
discharge the decontaminated air stream to the water stripper; and
a carbon dioxide stripper configured to desorb carbon dioxide from the second liquid sorbent into a contaminant stream.

2. The contaminant removal system of claim 1, wherein the first liquid sorbent has a higher capacity for water than the second liquid sorbent.

3. The contaminant removal system of claim 1, wherein the first liquid sorbent is an ionic liquid sorbent.

4. The contaminant removal system of claim 1,
wherein at least one of the water management system or the carbon dioxide removal system is further configured to remove one or more trace contaminants other than water or carbon dioxide from the respective cabin air stream or dehumidified air stream, and wherein the removed one or more trace contaminants are at least one of:

accumulated in the respective first or second liquid sorbent; or desorbed from the second liquid sorbent and discharged to the contaminant stream.

5. The contaminant removal system of claim 1, wherein each of the water scrubber and the water stripper comprises a hollow fiber membrane contactor that includes one or more hydrophobic porous membranes.

6. The contaminant removal system of claim 1, wherein the water management system further comprises a membrane dehumidifier configured to remove water from the cabin air stream prior to the water scrubber.

7. The contaminant removal system of claim 1, wherein the water management system further comprises:

a heater configured to heat the first liquid sorbent upstream of the water stripper; and a cooler configured to cool the first liquid sorbent upstream of the water scrubber.

8. The contaminant removal system of claim 1, wherein the water management system further comprises a heat exchanger configured to heat relatively cool first liquid sorbent discharged by the water scrubber using relatively warm first liquid sorbent discharged by the water stripper.

9. A method for removing contaminants from an environment, comprising:

removing, by a water management system, water from a cabin air stream using a first liquid sorbent to produce a dehumidified air stream, wherein the water management system comprises a water scrubber and a water stripper, and wherein removing the water from the cabin air stream includes at least:

absorbing, by the water scrubber, water from the cabin air stream into the first liquid sorbent; and desorbing, by the water stripper, the water from the first liquid sorbent into a decontaminated air stream; and removing, by a carbon dioxide removal system, carbon dioxide from the dehumidified air stream using a second liquid sorbent, wherein the carbon dioxide removal system comprises a carbon dioxide scrubber and a carbon dioxide stripper, and wherein removing the carbon dioxide from the dehumidified air stream includes at least:

receiving, by the carbon dioxide scrubber, the dehumidified air stream from the water scrubber;

absorbing, by the carbon dioxide scrubber, carbon dioxide from the dehumidified air stream into the second liquid sorbent;

discharging, by the carbon dioxide scrubber, the decontaminated air stream to the water stripper; and desorbing, by the carbon dioxide stripper, carbon dioxide from the second liquid sorbent into a contaminant stream.

10. The method of claim 9, wherein the first liquid sorbent has a higher capacity for water than the second liquid sorbent.

11. The method of claim 9, wherein the first liquid sorbent is an ionic liquid sorbent.

12. The method of claim 9, further comprising:

removing, by at least one of the water management system or the carbon dioxide removal system, one or more trace contaminants other than water or carbon dioxide from the respective cabin air stream or dehumidified air stream, wherein the removed one or more trace contaminants are at least one of:

accumulated in the respective first or second liquid sorbent; or desorbed from the second liquid sorbent and discharged to the contaminant stream.

13. The method of claim 9, wherein each of the water scrubber and the water stripper comprises a hollow fiber membrane separator that includes one or more hydrophobic porous membranes.

14. The method of claim 9, further comprising removing, by a membrane dehumidifier, water from the cabin air stream prior to the water scrubber.

15. The method of claim 9, further comprising:

heating, by a heater, the first liquid sorbent upstream of the water stripper; and cooling, by a cooler, the first liquid sorbent upstream of the water scrubber.

16. The method of claim 9, further comprising heating, by a heat exchanger, relatively cool first liquid sorbent discharged by the water scrubber using relatively warm first liquid sorbent discharged by the water stripper.

17. The contaminant removal system of claim 3, wherein the first liquid sorbent includes an imidazole salt.

18. The contaminant removal system of claim 1, wherein the water stripper is smaller than the carbon dioxide stripper.

19. The contaminant removal system of claim 4, wherein the first liquid sorbent has a higher affinity for the one or more trace contaminants than the second liquid sorbent.

* * * * *